(12) United States Patent
Holloway et al.

(10) Patent No.: US 8,282,723 B2
(45) Date of Patent: *Oct. 9, 2012

(54) MAGENTA INKJET INK HAVING IMPROVED PRINT QUALITY WITH POROUS PHOTO MEDIA

(75) Inventors: Ann P. Holloway, Lexington, KY (US); Meagan Winkler Sisk, Lexington, KY (US); Agnes Kam Zimmer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 524 days.

This patent is subject to a terminal disclaimer.

(21) Appl. No.: 12/503,132

(22) Filed: Jul. 15, 2009

(65) Prior Publication Data

US 2011/0014375 A1    Jan. 20, 2011

(51) Int. Cl.
*C09D 11/02* (2006.01)
*B05D 5/00* (2006.01)
*B41J 2/01* (2006.01)

(52) U.S. Cl. .......... 106/31.58; 106/31.51; 427/256; 347/100

(58) Field of Classification Search .......... 106/31.27, 106/31.51, 31.58, 31.43; 347/100; 427/256
See application file for complete search history.

(56) References Cited

U.S. PATENT DOCUMENTS

| | | | |
|---|---|---|---|
| 5,254,160 A | 10/1993 | Beach et al. | |
| 5,364,461 A | 11/1994 | Beach et al. | |
| 5,719,204 A | 2/1998 | Beach et al. | |
| 5,891,231 A | 4/1999 | Gnerlich et al. | |
| 5,981,623 A * | 11/1999 | McCain et al. | 106/31.27 |
| 5,994,427 A | 11/1999 | Kappele et al. | |
| 6,063,834 A | 5/2000 | Kappele et al. | |
| 6,267,807 B1 | 7/2001 | Harshbarger et al. | |
| 6,648,952 B1 | 11/2003 | Matsumoto et al. | |
| 6,652,634 B1 | 11/2003 | Akers, Jr. et al. | |
| 6,843,838 B2 | 1/2005 | Zimmer et al. | |
| 6,896,724 B2 | 5/2005 | Sun et al. | |
| 6,984,701 B2 | 1/2006 | Sacoto et al. | |
| 7,034,149 B2 | 4/2006 | Hirokazu et al. | |
| 7,056,374 B2 | 6/2006 | Kitayama et al. | |
| 7,066,991 B2 * | 6/2006 | Blease et al. | 106/31.51 |
| 2004/0048745 A1 | 3/2004 | Kitamura et al. | |
| 2004/0072923 A1 | 4/2004 | Matsunami et al. | |
| 2004/0102541 A1 | 5/2004 | Sacoto et al. | |
| 2004/0127619 A1 | 7/2004 | Sun et al. | |
| 2007/0259989 A1 | 11/2007 | Berge et al. | |
| 2011/0014376 A1 * | 1/2011 | Sisk et al. | 427/256 |

* cited by examiner

*Primary Examiner* — Helene Klemanski

(57) ABSTRACT

The present invention relates to magenta dye-based inkjet inks having improved permanence when jetted onto porous photo media. The inkjet ink includes a mixture of at least two magenta dyes, at least three co-solvents comprising about 18 to about 24% of the composition of the ink by weight, a penetrant, at least one wetting agent, and water.

18 Claims, No Drawings

MAGENTA INKJET INK HAVING IMPROVED PRINT QUALITY WITH POROUS PHOTO MEDIA

CROSS REFERENCE TO RELATED APPLICATIONS

Not applicable.

MICROFICHE APPENDIX

Not applicable.

GOVERNMENT RIGHTS IN PATENT

Not applicable.

BACKGROUND OF THE INVENTION

1. Field of the Invention

The present invention relates to inkjet inks, and, more particularly, to magenta inkjet inks having improved print quality with porous media.

2. Description of the Related Art

Thermal inkjet printing, to which this invention relates, is a commonly practiced form of printing. Thermal inkjet printing involves intense heating of an aqueous ink in a small amount in contact with a heating element so the ink is vaporized. The vaporized ink, including solids in the ink, is then expelled through a nozzle and subsequently jetted to an intended substrate, such as, for example, paper.

The composition of an inkjet ink is traditionally comprised of deionized water, a water-soluble organic solvent, and a colorant. The colorant may be a soluble dye or insoluble pigment. Traditionally, pigment based inks may have some disadvantages as compared to dye based inks as traditional pigment based inks tend to have slightly higher solids and viscosity which may pose to be more difficult for jetting through relatively smaller nozzle printhead designs. For example, due to the insolubility of pigments in water, polymeric dispersants and/or surfactants are typically added to improve the dispersibility of the pigment. The addition of a polymeric dispersant can increase the viscosity of an ink, and a viscous ink may be more difficult to jet in a printhead.

Inkjet printers may use dye-based color inks or pigment-based color inks. Dye-based color inks tend to be more saturated and more robust to inkjet pens. In contrast, pigment-based color inks tend to be more permanent and of the quality typically recognized with laser-like printers.

There is a very limited choice of pigments for use with pigment-based color inks, whereas the number of dyes to be used with dye-based color inks continuously grows.

A current challenge in the industry is to develop faster drying dye-based inks for use with porous photo media, rather than for use with traditional swellable polymer photo media. However, porous photo media are comprised of inorganic materials that, in conjunction with ozone gasses and light, interact with dyes such that the dyes fade and degrade.

What is needed in the art is a magenta dye-based inkjet ink that may be used with porous photo media with substantially minimal fading and degradation of the magenta dye.

SUMMARY OF THE INVENTION

Exemplary embodiments of the present invention provide an inkjet ink comprised of a mixture of two or more magenta dyes, at least three co-solvents comprising about 18% to about 24% of the composition of the ink by weight, a penetrant, at least one wetting agent, and water.

Various other exemplary embodiments of the present invention include a method of printing using an inkjet ink. The method is comprised of the steps of positioning a porous photo medium substantially adjacent to a printer having a print head retaining an inkjet ink, wherein the inkjet ink is comprised of a mixture of two or more magenta dyes, at least three co-solvents comprising about 18% to about 24% of the composition of the ink by weight, a penetrant, at least one wetting agent, and water. The inkjet ink is then jetting from the print head onto the porous photo medium.

DETAILED DESCRIPTION OF THE INVENTION

Porous photo media, as opposed to traditional swellable polymer photo media, tends to allow for faster drying. As such, it is desired to develop dye-based inks that allow greater permanence with the porous photo media. However, as noted above, porous photo media are comprised of inorganic materials that, in conjunction with ozone gasses and light, interact with dyes such that the dyes fade and degrade.

Permanence, as used herein, refers in part to the ability of a dye to resist the interactions with light, ozone, temperature, and humidity that cause fading and degradation of the dye associated with the media.

It has been found that a color inkjet ink having a mixture of two or more magenta dyes, three co-solvents, a penetrant, and a wetting agent has an increased permanence when used with porous photo media.

In exemplary embodiments, the inkjet ink may further be comprised of a biocide, such as, for example, PROXEL® GXL (available from Arch Chemicals, Inc. of Norwalk, Conn.).

In the various exemplary embodiments of the present invention, the mixture of two or more magenta dyes of the inkjet ink comprises about 3.0% to about 6.0% of the composition of the ink by weight. In a preferred embodiment, the mixture of two more magenta dyes comprises about 4.0% of the composition of the ink by weight.

The mixture of two more magenta dyes may include dyes selected from the group consisting of Nippon Magenta JPD LM-1 Liquid (an anthrapyridone disulfonic acid available from Nippon Kayaku Co, Ltd of Tokyo, Japan) and a magenta dye as described in U.S. Pat. No. 5,254,160 (available from Lexmark International, Inc. of Lexington, Ky.), the chemical structure of which is:

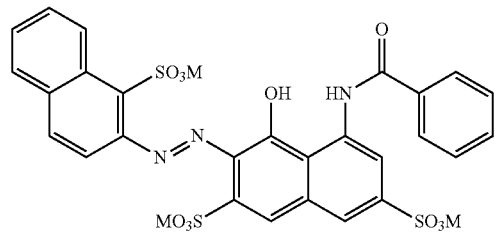

wherein M is H, Li, Na, or K. Although the color is visually more appealing with the magenta dye as described in U.S. Pat. No. 5,254,160, the Nippon Magenta JPD LM-1 Liquid is more lightfast on porous media.

In an exemplary embodiment, the amount of each of Nippon Magenta JPD LM-1 Liquid and a magenta dye as described in U.S. Pat. No. 5,254,160 are substantially equal. In another exemplary embodiment, the amount of each dye in the mixture is about 2%.

In particular, the color of the Nippon Magenta JPD LM-1 Liquid may be toned by being further combined with one or more of dyes selected from Acid Red 35, Acid Red 52, Acid Red 81, Acid Red 92, Acid Red 249, Acid Red 289, Direct Red 289, Direct Red 227, Direct Violet 107 (available commercially as PROJET® Magenta 2 from Fujifilm of Tokyo, Japan), PROJET® Magenta 3BOA (available commercially from Fujifilm of Tokyo, Japan), DUASYN® Magenta NM-SF (available commercially from Clariant of Coventry, R.I.), ILFORD® M377 (available commercially from Ilford of Marly, Switzerland), and combinations thereof.

The at least three co-solvents are selected from the group consisting of 1,3-propanediol; 1,2-alkanediol; 1,5-pentanediol; triethylene glycol; and dipropylene glycol.

In exemplary embodiments, at least two of the three co-solvents are alkanediols and the third co-solvent is a glycol.

The penetrant is preferably about 1.0% to about 3.5% of the composition of the ink by weight. A exemplary penetrant is 1,2-hexanediol.

It is preferred that the wetting agent be of about 0.5% to about 1.5% by weight of the inkjet ink. In a more preferred embodiment, the non-ionic silicone surfactant is about 0.75% by weight of the inkjet ink.

Exemplary wetting agents include polyoxyethylene dimethyl siloxanes, ZONYL® fluorosurfactants, and combinations thereof. A commercially available wetting agent is, for example, SILWET® L-7600 (polyalkylene oxide grafted polydimethylsiloxane from Momentive Performance).

The polymeric dispersant is preferably about 0.5% to about 2.0% by weight of the inkjet ink, and assists in stabilizing the carbon black pigment and buffering the pH of the inkjet ink.

An optional polymeric dispersant can be added to assist in stabilizing the compatibility with a carbon black pigment ink in a Cyan-Magenta-Yellow-Black (CMYK) inkset. When CMYK inks are printed in substantially close proximity to each other, each ink needs to be compatible and not destabilize adjacent inks. In the present exemplary embodiments, the CMY dye inks may be printed along with a black pigmented ink without destabilizing any of the CMY dye inks or the black pigmented ink due to the presence of the polymeric dispersant in the C dye inks.

In exemplary embodiments of the present invention, the polymeric dispersant may be selected from dispersants set forth in, for example, any of U.S. Pat. Nos. 5,719,204; 5,994,427; 6,063,834; 6,267,807; 6,896,724; and 6,984,701, all incorporated by reference.

One or more buffers may also be included in the inkjet ink composition. Exemplary embodiments of the one or more buffers include triethanolamine (TEA), N,N-bis(2-hydroxyethyl)tuarine or N,N-bis(2-hydroxyethyl)-2-aminoethane sulfonic acid (BES), or combinations thereof.

Several exemplary inkjet inks according to the present invention were formulated and evaluated using a standard printhead and porous photo paper in the form of Perfectfinish Glossy Photo Paper (available from Lexmark International, Inc. of Lexington, Ky.). The same printing was conducted using a commercially available magenta dye-based inkjet ink. Each ink was evaluated for its permanence against the effects of ozone and xenon light.

In Table 1, the permanence of each dye-based ink on porous photo media is compared. The numbers shown represents the number of years of permanence according to the criteria of 40% density loss and assuming the exposure level of 78 ppm-hr/yr for ozone and 1.1 Mlux-hr/yr for light fade.

TABLE 1

Permanence of Dye with Porous Photo Media

| Ink | Years of Permanence after Exposure to: | |
|---|---|---|
| | Ozone (1 ppm or 5 ppm) | Xenon LF (80 klux) |
| Magenta Inkjet Ink | 4 | 8 |
| Commercially Available Magenta-dye Based Inkjet Ink | 1 | 7 |

As clearly illustrated above, the present magenta-dye based inkjet ink shows an improvement in permanence when exposed to ozone four times greater than that of commercially available magenta-dye inkjet inks undergoing the same exposure. When exposed to xenon light, the magenta inkjet ink of the present invention showed a permanence 114% greater than that of a commercially available magenta-dye inkjet ink.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which, this invention pertains and which fall within the limits of the appended claims.

What is claimed is:

1. An inkjet ink comprising:
   a mixture of at least two magenta dyes;
   at least three co-solvents comprising about 18% to about 24% of the composition of the ink by weight;
   a penetrant;
   a wetting agent selected from the group consisting of polyoxyethylene dimethyl siloxanes, fluorosurfactants, and combinations thereof;
   a polymeric dispersant about 0.5% to about 2.0% by weight of the inkjet ink; and
   water.

2. The inkjet ink according to claim 1, wherein the at least two magenta dyes comprise about 3.0% to about 6.0% of the composition of the ink by weight.

3. The inkjet ink according to claim 1, the mixture of at least two magenta dyes includes an anthrapyridone disulfonic acid liquid magenta dye and a magenta dye having the chemical structure:

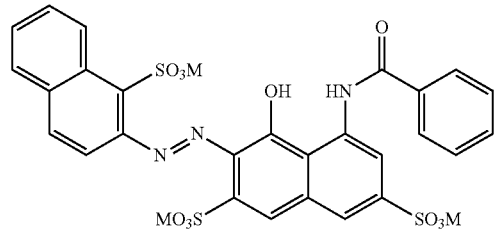

wherein M is H, Li, Na, or K.

4. The inkjet ink according to claim 3, wherein the amount of each of the anthrapyridone disulfonic acid liquid magenta dye and the magenta dye having the identified chemical structure is substantially equal.

5. The inkjet ink according to claim 3, wherein the anthrapyridone disulfonic acid liquid magenta dye is toned with one or more of Acid Red 35, Acid Red 52, Acid Red 81, Acid Red 92, Acid Red 249, Acid Red 289, Direct Red 289, Direct Red 227, or Direct Violet 107.

6. The inkjet ink according to claim 1, wherein the at least three co-solvents are selected from the group consisting of 1,3-propanediol; 1,2-alkanediol; 1,5-pentanediol; triethylene glycol; and dipropylene glycol.

7. The inkjet ink according to claim 1, wherein two of the at least three co-solvents are alkanediols and the third co-solvent is a glycol.

8. The inkjet ink according to claim 1, wherein the wetting agent is about 0.5% to about 1.5% of the composition of the ink by weight.

9. The inkjet ink according to claim 1, further comprising one or more buffers selected from the group consisting of triethanolamine (TEA), N,N-bis(2-hydroxyethyl)tuarine, N,N-bis(2-hydroxyethyl)-2-aminoethane sulfonic acid (BES), and combinations thereof.

10. The inkjet ink according to claim 1, further comprising a biocide.

11. The inkjet ink according to claim 1, wherein the penetrant is a 1,2-alkanediol.

12. A method of printing utilizing an inkjet ink, the method being comprised of the steps of:
positioning a print medium substantially adjacent to a printer having a print head retaining an inkjet ink, wherein the inkjet ink is comprised of
a mixture of at least two magenta dyes;
at least three co-solvents comprising about 18% to about 24% of the composition of the ink by weight;
a penetrant;
a wetting agent selected from the group consisting of polyoxyethylene dimethyl siloxanes, fluorosurfactants and combinations thereof;
a polymeric dispersant about 0.5% to about 2.0% by weight of the inkjet ink; and
water;
jetting the inkjet from the print head onto a porous photo medium.

13. The method of printing utilizing an inkjet ink according to claim 12, wherein the mixture of at least two magenta dyes comprises about 3.0% to about 6.0% of the composition of the ink by weight.

14. The method of printing utilizing an inkjet ink according to claim 12, the mixture of at least two magenta dyes includes an anthrapyridone disulfonic acid liquid magenta dye and a magenta dye having the chemical structure

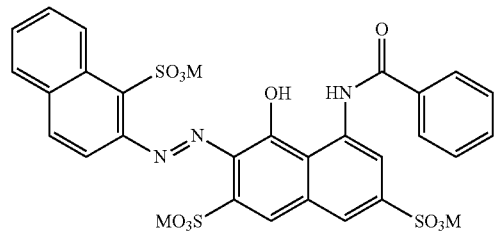

wherein M is H, Li, Na, or K.

15. The method of printing utilizing an inkjet ink according to claim 14, wherein the amount of each of the anthrapyridone disulfonic acid liquid magenta dye and the magenta dye having the identified chemical structure is substantially equal.

16. The method of printing utilizing an inkjet ink according to claim 12, wherein the at least three co-solvents are selected from the group consisting of 1,3-propanediol; 1,2-alkanediol; 1,5-pentanediol; triethylene glycol; and dipropylene glycol.

17. The method of printing utilizing an inkjet ink according to claim 12, wherein the wetting agent is about 0.5% to about 1.5% of the composition of the ink by weight.

18. The method of printing utilizing an inkjet ink according to claim 12, further comprising one or more buffers selected from the group consisting of triethanolamine (TEA), N,N-bis (2-hydroxyethyl)tuarine, N,N-bis(2-hydroxyethyl)-2-aminoethane sulfonic acid (BES), and combinations thereof.

* * * * *